(12) United States Patent
Shapiro et al.

(10) Patent No.: US 9,467,412 B2
(45) Date of Patent: Oct. 11, 2016

(54) SYSTEM AND METHOD FOR AGENT-BASED INTEGRATION OF INSTANT MESSAGING AND VIDEO COMMUNICATION SYSTEMS

(71) Applicant: Vidyo, Inc., Hackensack, NJ (US)

(72) Inventors: Ofer Shapiro, Fair Lawn, NJ (US); Amir Shaked, North Bergen, NJ (US); Alexandros Eleftheriadis, Tenafly, NJ (US)

(73) Assignee: VIDYO, INC., Hackensack, NJ (US)

( * ) Notice: Subject to any disclaimer, the term of this patent is extended or adjusted under 35 U.S.C. 154(b) by 0 days.

(21) Appl. No.: 14/023,674

(22) Filed: Sep. 11, 2013

(65) Prior Publication Data

US 2014/0071224 A1 Mar. 13, 2014

Related U.S. Application Data

(60) Provisional application No. 61/699,465, filed on Sep. 11, 2012.

(51) Int. Cl.
*H04N 7/14* (2006.01)
*H04L 12/58* (2006.01)
*H04N 7/15* (2006.01)
*H04L 12/18* (2006.01)

(52) U.S. Cl.
CPC ............ *H04L 51/32* (2013.01); *H04L 12/1818* (2013.01); *H04L 12/1822* (2013.01); *H04L 51/046* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 5,886,691 A | 3/1999 | Furuya et al. | |
| 6,301,609 B1 | 10/2001 | Aravamudan et al. | |
| 6,809,749 B1 | 10/2004 | Chen et al. | |
| 7,219,072 B1 | 5/2007 | Sundaresan | |
| 7,593,032 B2 | 9/2009 | Civanlar et al. | |
| 8,140,980 B2 | 3/2012 | Gunasekar et al. | |
| 2002/0118809 A1* | 8/2002 | Eisenberg | H04L 12/1813 379/202.01 |
| 2003/0105820 A1* | 6/2003 | Haims | G06Q 10/10 709/205 |
| 2003/0174202 A1 | 9/2003 | Eshkoli et al. | |
| 2005/0021645 A1 | 1/2005 | Kulkarni et al. | |
| 2005/0034079 A1 | 2/2005 | Gunasekar et al. | |
| 2005/0069116 A1 | 3/2005 | Murray, II | |
| 2005/0210393 A1 | 9/2005 | Maeng | |
| 2005/0289471 A1 | 12/2005 | Thompson et al. | |
| 2006/0009243 A1 | 1/2006 | Dahan et al. | |
| 2006/0123082 A1* | 6/2006 | Digate | G06Q 10/107 709/205 |

(Continued)

FOREIGN PATENT DOCUMENTS

| | | |
|---|---|---|
| CN | 101141612 | 3/2008 |
| EP | 0 821 529 | 1/1998 |

(Continued)

OTHER PUBLICATIONS

U.S. Appl. No. 13/487,008, Jun. 25, 2014 Notice of Allowance.

(Continued)

*Primary Examiner* — Maria El-Zoobi
(74) *Attorney, Agent, or Firm* — Baker Botts L.L.P.

(57) ABSTRACT

A method and related apparatus for initiating videoconferences in instant messaging systems is described, including using an agent to represent the videoconferencing system into the instant messaging system and enabling control using hyperlinked information posted by the agent into the instant messaging message area.

15 Claims, 6 Drawing Sheets

Instant Messaging System

(56) References Cited

U.S. PATENT DOCUMENTS

| | | |
|---|---|---|
| 2008/0052377 A1 | 2/2008 | Light |
| 2008/0239062 A1 | 10/2008 | Civanlar et al. |
| 2009/0132583 A1 | 5/2009 | Carter et al. |
| 2010/0138450 A1 | 6/2010 | Fishman et al. |
| 2010/0180211 A1 | 7/2010 | Boyd |
| 2011/0093548 A1 | 4/2011 | Das et al. |
| 2011/0191692 A1 | 8/2011 | Walsh et al. |
| 2012/0274725 A1 | 11/2012 | Robertson et al. |

FOREIGN PATENT DOCUMENTS

| | | |
|---|---|---|
| JP | 2003-324705 | 11/2003 |
| JP | 2005-109929 | 4/2005 |
| JP | 2007-516674 | 6/2007 |
| JP | 2007-189689 | 7/2007 |
| JP | 2007-534266 | 11/2007 |
| JP | 2009-043201 | 2/2009 |
| WO | WO 2004/107631 | 12/2004 |
| WO | WO 2007/067990 | 6/2007 |
| WO | WO 2007/076486 | 7/2007 |
| WO | WO 2007/103889 | 9/2007 |
| WO | WO 2008/086423 | 7/2008 |
| WO | WO 2009/114556 | 9/2009 |
| WO | WO 2011/038003 | 3/2011 |
| WO | WO 2011/069018 | 6/2011 |
| WO | WO 2012/112139 | 8/2012 |

OTHER PUBLICATIONS

International Search Report and Written Opinion for PCT/US2012/041695, dated Aug. 6, 2012.

International Search Report and Written Opinion for PCT/US2013/074993, dated May 27, 2014.

U.S. Appl. No. 13/487,008, May 21, 2014 Response to Non-Final Office Action.

U.S. Appl. No. 13/487,008, Mar. 17, 2014 Non-Final Office Action.

International Search Report and Written Opinion for PCT/US2013/059313, dated Mar. 27, 2014.

U.S. Appl. No. 14/495,307, filed Sep. 24, 2014.

International Search Report and Written Opinion for PCT/US13/059139, dated Mar. 18, 2014.

International Search Report and Written Opinion for PCT/US10/058801, dated Jan. 24, 2011 (corresponds to U.S. Appl. No. 13/487,008).

\* cited by examiner

FIG. 1: Instant Messaging System
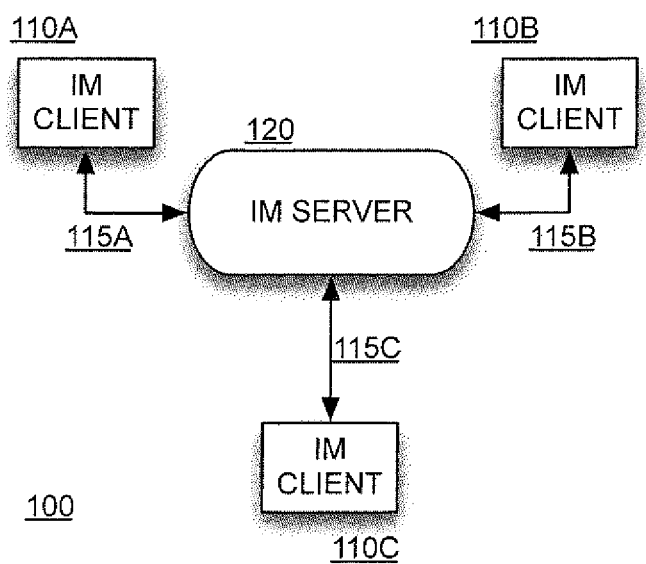

FIG. 2: Videoconferencing System
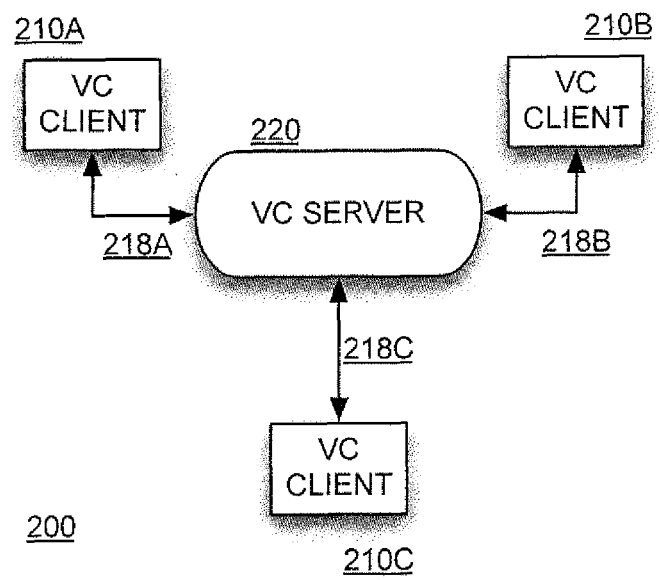
(a)
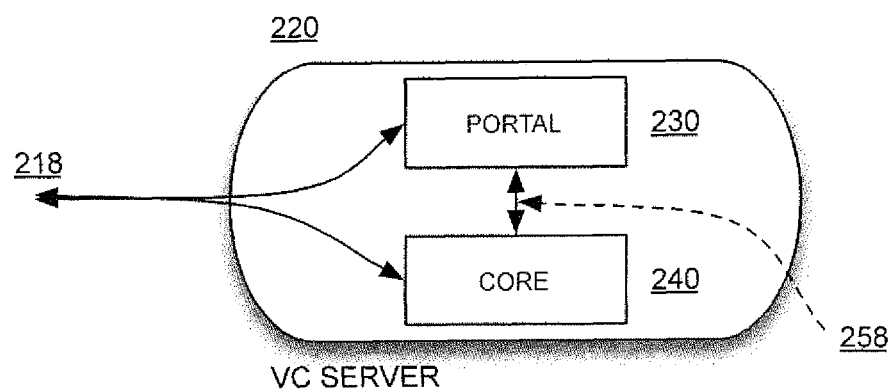
(b)

FIG. 3: Combined IM and VC System
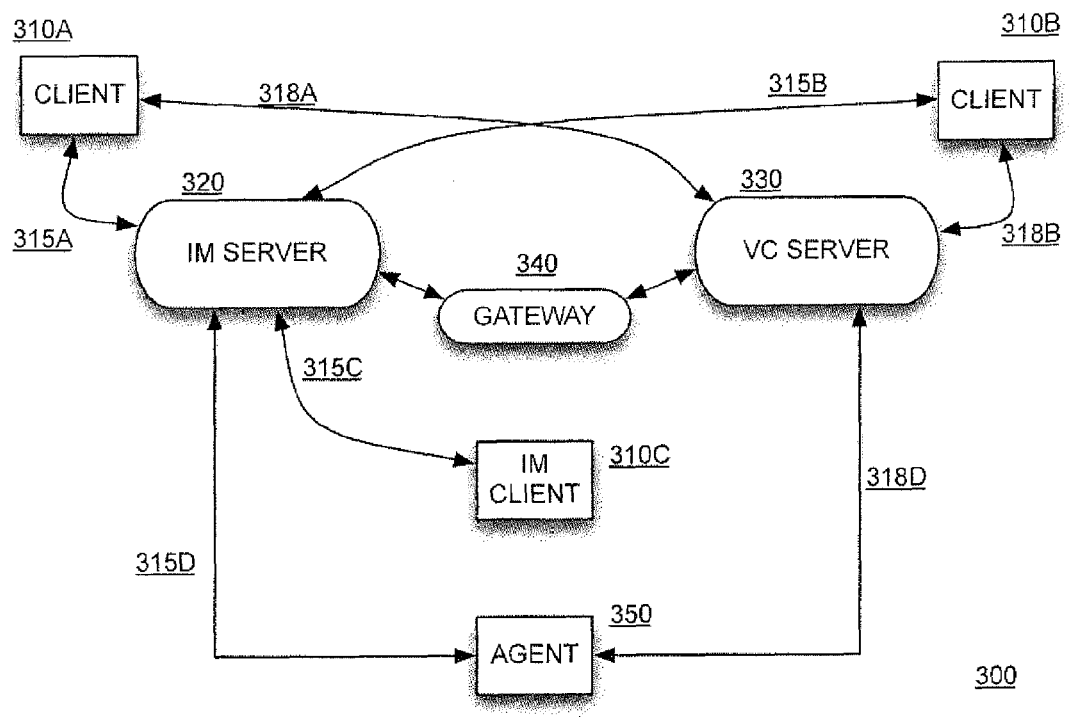

FIG. 4: Client System Architecture
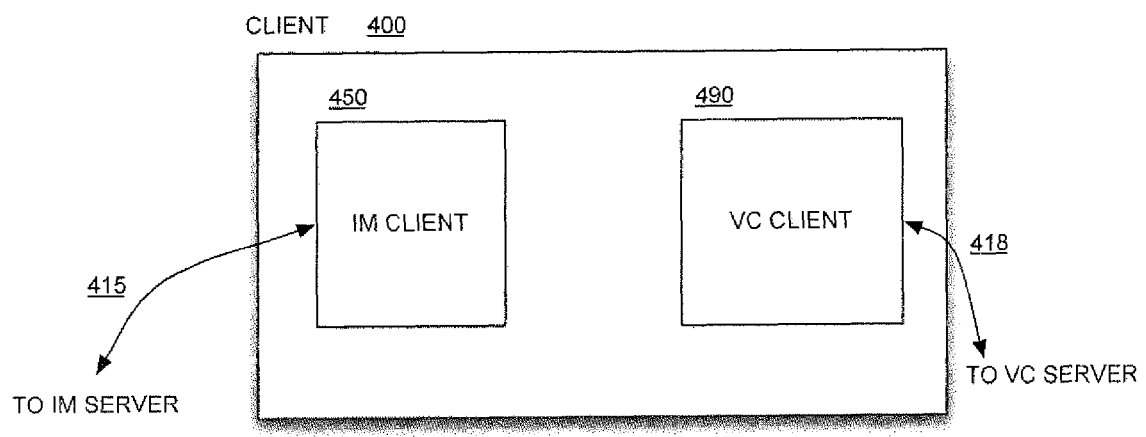

FIG. 5: Screenshots setting up a room URL
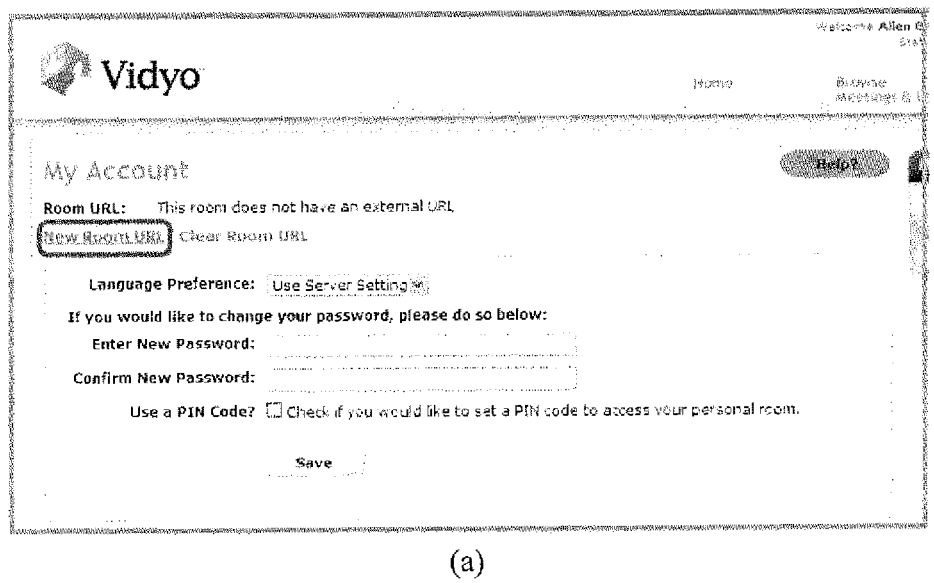
(a)
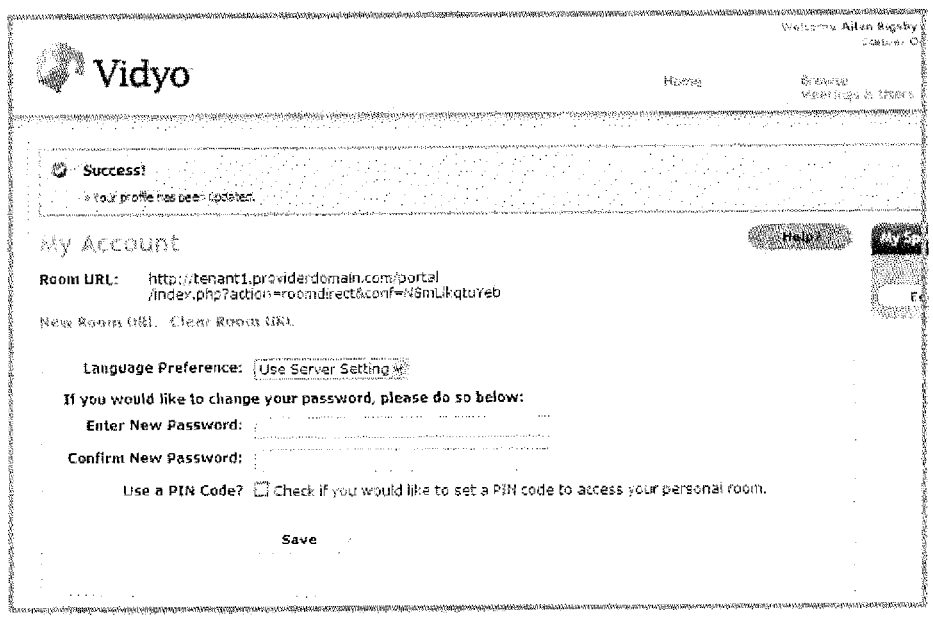
(b)

FIG. 6: Computer system
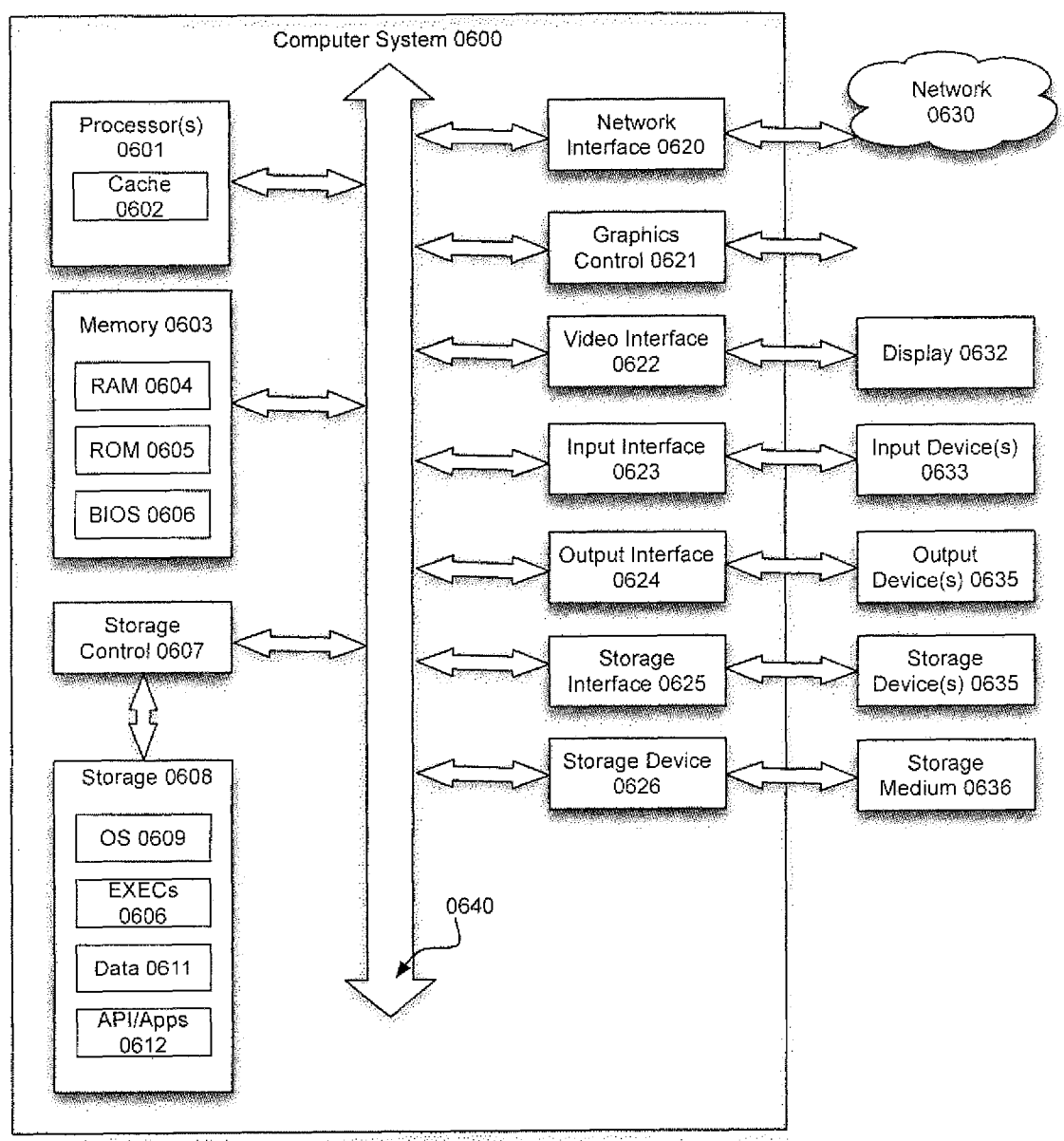

SYSTEM AND METHOD FOR AGENT-BASED INTEGRATION OF INSTANT MESSAGING AND VIDEO COMMUNICATION SYSTEMS

CROSS REFERENCE TO RELATED APPLICATIONS

This application claims priority to U.S. Provisional App. Ser. No. 61/699,465, titled, "System and Method for Agent-Based Integration of Instant Messaging and Video Communication Systems," filed Sep. 11, 2012, the disclosure of which is incorporated herein by reference in its entirety.

FIELD

The disclosed subject matter relates generally to digital communication using instant messaging as well as digital audio and video.

BACKGROUND INFORMATION

Instant Messaging (IM) systems have proliferated, with several commercial offerings available. These systems can allow individual users to communicate with other users using text, audio, video, and other types of multimedia data. Examples include free offerings such as Skype and Google Talk, as well as commercial, enterprise systems such as the original Microsoft Office Communication Server (hereinafter 'OCS') and its associated client Microsoft Office Communicator, and its version called Microsoft Lync.

Certain systems can provide a so-called "presence engine" as well as the ability to communicate via text-based messages. The presence engine is typically responsible for registering the status of a user (e.g., available to communicate, idle, unavailable, etc.) and reporting it to other users (such as co-workers, users declared in the system as 'friends' of the specific user, etc.). A user may initiate communication by typing a text message in a window, addressed to another user. The intended recipient of the message may be notified by the software and may be offered the opportunity to reply.

Many IM systems offer the ability to conduct text-based conversations among groups of users, i.e., with groups of more than two users at a time. Several IM systems offer the ability to combine the text-based communication with audio communication whereas others offer the ability to use video as well.

Due to the complexity in offering multi-point video communication, certain systems allow multi-user audio communication (e.g., Skype or Google Talk) but only person-to-person video communication. The technical problems in multi-point video may be significant, especially when desktop operation is desired (generally a requirement for an IM system).

One solution for videoconferencing uses Scalable Video Coding and the so-called Scalable Video Communication Server (SVCS) architecture described in part in commonly assigned U.S. Pat. No. 7,593,032, incorporated herein by reference in its entirety. This solution can allow telepresence-quality multi-point video communication even from regular PC and Mac desktops. It thus can be suitable far use in a desktop-based IM system.

It can be desirable to provide a system and method through which a multi-point video and audio communication system can be seamlessly integrated with the operation of an IM system. Commonly assigned International Patent Application No. PCT/US10/58801, "System and method for combining instant messaging and video communication systems," incorporated herein by reference in its entirety, describes mechanisms for integrating IM systems and video communication systems by using URLs placed by users in the IM system's chat window. Users who are not registered on, or logged in to, the videoconferencing system can click on the URL to join a session. The system described therein can use a plug-in to be installed alongside the IM client software to enable communication between the two system components.

It can also be desirable to be able to integrate the videoconferencing system with the IM system without relying on a plug-in, and to integrate the multi-point videoconferencing system with any video and audio communication capabilities offered by the IM system itself. This can provide an improved user experience when the videoconferencing system software is available, but also can allow users without it to connect using the native video and audio communication capabilities of the IM system.

SUMMARY

Techniques are disclosed herein for initiating a videoconference between an initiating user and one or more selected users in an instant messaging system that uses an agent of the videoconference system. In one or more illustrative embodiments, the agent can represent the videoconferencing system and, when invited into an instant messaging chat, it can create a videoconference URL that allows users to join a videoconferencing session and can place it into the instant messaging chat. When users click the URL, if they already have the associated videoconferencing software, then they can join the videoconferencing session; if they do not, they can join the videoconferencing session through a gateway device that interconnects the native IM audio and video system with the videoconferencing system.

BRIEF DESCRIPTION OF THE DRAWINGS

Further features, the nature, and various advantages of the disclosed subject matter will be more apparent from the following detailed description and the accompanying drawings in which:

FIG. 1 is a schematic illustration of an exemplary instant messaging system;

FIG. 2 is a schematic illustration of an exemplary videoconferencing system;

FIG. 3 is a schematic illustration of an exemplary system combining instant messaging and videoconferencing functionality in accordance with the principles an embodiment of the disclosed subject matter;

FIG. 4 is a schematic illustration of the client system architecture in accordance with the principles an embodiment of the disclosed subject matter;

FIG. 5 provides exemplary screen snapshots during the process of creating a room URL; and FIG. 6 shows an exemplary computer system in accordance with an embodiment of the disclosed subject matter.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

FIG. 1 depicts the architecture of an exemplary IM system 100. The system can include an IM Server 120 and one or more users that employ IM Client systems 110. In the figure three such clients are shown (110A, 110B, and 110C), but any number of clients can be used. The IM Clients 110 can be connected to the IM Server 120 through a network over connections 115. In an embodiment, a packet-based network using the Internet Protocol (IP) can be used, but other types of networks are also possible.

The IM Client 110 can be standalone software installed and running on a user's computer, or it can be a web page that is loaded from the IM Server 120 (or another server) onto a user's browser. In the latter case, the connections 115 may not be over a network, but instead within the IM Server 120.

In an IM system such as the one shown in FIG. 1, users can employ their IM Client 110 to log in to the IM Server 120 that registers their name and availability. In other words, a user can connect to the IM system stating that it is user, for example, 'bob', and provide a password. During the time the user remains logged in, the system can consider the user available for communication. The user may be given the option to select the type of 'status' that he or she wants the system to report. For example: away, not available, do not disturb, invisible, and offline. One example of a commercially available IM system is Microsoft Lync.

FIG. 2(a) depicts the architecture of an exemplary videoconferencing system 200. The system includes one or more VC Servers 220 and one or more VC Clients 210. Three such clients are shown in the figure (A, B, and C), with a single VC Server for purposes of illustration—the disclosed subject matter can be directly used in the case where multiple VC Servers 220 are present, and with any number of VC Clients. The VC Clients 210 and the VC Server 220 are connected via network connections 218 (A through C). In an embodiment, the IP protocol is used for the underlying network. The VC Client 210 may be a standalone system such as a computer-based system with a camera and one or more displays, or it can be software that is downloaded and run on a user's computer.

FIG. 2(b) depicts the architecture of the VC Server 220. The server can include two components, a Portal 230 and a Core 240. In an embodiment, the Portal 230 is a web-based registration service, where users log in and through which they can initiate, receive, or control videoconferencing calls. The VC Server 220 also can include the Core 240 module, which is the component that receives, processes, and forwards media. As shown in the figure, the information carried over network connection 218 can be split between the Portal 230 and the Core 240, with media data flowing to/from the Core 240, and user/session management data flowing to/from the Portal 230.

The Portal 230 and Core 240 may communicate through a connection 258. Although the VC Server is shown as a single unit, the Portal 230 and Core 240 can be hosted on distinct systems that may even be physically in different locations. In that case, the connection 258 can be over the network, rather than being an internal connection within a single system.

In an embodiment, the VC Server Core is a Scalable Video Communication Server (SVCS), as described in part in U.S. Pat. No. 7,593,032, previously cited. Alternative VC Server Core architectures include the traditional switching Multipoint Control Unit (MCU) or the transcoding MCU, among others.

FIG. 3 depicts an integrated IM and VC system 300 in accordance with an aspect of the disclosed subject matter. The system of FIG. 3 has two servers, an IM Server 320 and a VC Server 330. One or more Clients 310, in this example two (A and B), can be connected to both servers using corresponding connections 315 and 318, respectively. Some clients, in this example IM Client 310C, may be connected only to the IM Server 320 using a corresponding connection 315C.

The IM Server 320 and VC Server 330 operate as with the standalone systems shown in FIG. 1 and FIG. 2, respectively. In some embodiments, there may be a Gateway 340 that is able to interconnect the IM Server 320 and VC Server 330. Such gateway devices can operate as an IM client on the IM Server 320 side, and as a VC client on the VC Server 330 side. Internally, they perform all necessary signaling and media conversions (e.g., audio and/or video transcoding) to allow information from one system to be understood in the other system. The Gateway 340 may be controlled by the Portal 230 of the VC Server 330.

The integrated IM and VC System 300 can feature two types of clients: Clients 310A and 310B that offer dual IM and VC capability; and IM Client 310C that offers only IM capability.

FIG. 4 shows the Client system architecture in accordance with an aspect of the disclosed subject matter. The Client 400 can contain an IM client module 450 and a VC client module 490. The IM client module 450 can operate as an IM Client, in the same way as the IM Client(s) shown in FIG. 1. Similarly, the VC client module 490 can operate as a VC Client in the same way as the VC Client(s) shown in FIG. 2.

Notice that the IM client module 450 can communicate with the IM server via the connection 415, whereas the VC client module 490 can communicate with the VC Server via the connection 418. The VC Server interface through the connection 418 in an embodiment where the system is used is SOAP-based.

Although the VC Client module 490 is shown here as part of the Client 400, it is noted that this is only a logical association. The VC Client module 490 could be in the same computer system as the IM Client 450, or it could be in a different system, possibly even at a different physical location. That the VC Client module 490 communicates with the rest of the system through connection 418 can make the actual physical location of the VC Client module 490 irrelevant. A significant benefit of this architecture is that the VC Client module 490 could be a standalone videoconferencing system. In this case, the videoconference would run on a separate computer system than the IM Client 450, but the process of initiating the videoconference from the IM system, as disclosed below, can be identical.

An IM Client such as IM Client 310C of FIG. 3 may only provide the IM Client 450 module (including the connection 415) and not the VC Client 490 module.

When the Client 400 system is operated, it should be provided with the login credentials of the user on the IM and VC systems of FIG. 3. Indeed, the IM Server 320 and the VC Server 330 may offer completely different log in systems (e.g., with user credentials originating from different databases). In an embodiment, the user name is identical in both systems. This can simplify the implementation because the system does not have to maintain a mapping database between user names on the IM system and user names on the VC system. It would of course be possible to use such a database.

Whereas the servers here can be identical to the servers used in traditional, standalone IM and VC systems, the difference lies in the presence and operation of the Agent 350 shown in FIG. 3. The Agent 350 can connect to both the IM Server 320 and the VC Server 330. It may be located on its own system, or it may be operating together with the VC Server or associated VC Server Portal.

In certain existing systems, logged in users are allowed to start up videoconferencing calls and invite guest users to join them, even if they do not have log in privileges on the videoconferencing system portal. These users can utilize a special URL generated by the portal for the particular user that is conducting the videoconferencing call. The URL may be associated with a user's "room", i.e., a logical entity offered by the portal where any registered user can freely join in (unless the "room" is protected by a PIN or password). Rooms can be the logical entity in which multi-point videoconferencing sessions take place. In some embodiments, users may not be associated with fixed rooms, and room (or meeting place in general) associations may be created on demand by the server or portal hosting the conference. Accessing the room (or equivalent location-identifying) URL can enable anyone to log in as "guest" into the system, install the VC client software if not already installed and running, and connect to the conference call of the particular user. This can further enable registered users to conduct conference calls with any user, whether he is registered on the VC system or not. This is shown in FIG. 5(a) and (b) where the "My Account" page is shown as produced by an exemplary portal; in FIG. 5(a) there is no URL yet created, whereas in FIG. 5(b) the URL has been created and is available for use.

The client software can automatically be provided through the portal, so that the users do not have to pre-install software in advance of making a call. The user may be prompted to download the software after connecting to the portal through the URL, if the software is not already available and running on the user's computer.

An exemplary process for initiating a videoconferencing call will next be described with reference to FIG. 3. The Agent 350 has an IM account and is logged into the IM Server 320 as, for example, user 'Video'. Regular IM users at the Clients 310 can include the user 'Video' in their list of users (oftentimes referred to as "friends", or "buddies" in different implementation of IM systems). In addition, they can include the user 'Video' in any calendar invitations that they create and send to other users, e.g., using software such as Microsoft® Outlook®. The Agent 350 may automatically accept such invitations.

When the Agent 350 is invited into an IM chat by a user (by inviting its 'Video' IM user into the chat), the Agent 350 can place an invitation string with a session initialization URL to the videoconference into the chat. An example invitation string may be: "Hello. Please click the following link to join a videoconference callto://video/hash". The "callto:" can be a protocol URL that instructs the underlying operating system to invoke the application associated with "callto:" URLs. For example, the "http:" protocol indication can be associated with a Web browser such as Microsoft Explorer, Apple Safari, or Google Chrome. The "hash" can be a code that is generated by the Agent 350 (or the associated VC Server 330 portal) and encodes the user and room identities. Alternative ways of associating the user and room identifies with the URL are also possible. If a user is not registered on the VC Server 330, the Agent 350 or the associated portal on the VC Server 330 may generate a one-time room for this particular session. The Agent 350 may also register the videoconferencing session on the Gateway 340 so that connections incoming to the Gateway 340 through the IM Server 320 can be serviced. This may be accomplished through the VC Server 330 or directly with the Gateway 340.

If a participant user is on a client that features both IM Client and VC Client support and clicks on the above URL, then the VC Client software can start up and connect the participant to the initiator's room. This can be accomplished by associating the VC Client as the handler for the particular protocol URL, instead of the IM Client. If a participant is on a client that features only IM Client support and clicks on the above URL, then the regular IM Client can initiate a connection to the videoconferencing session through the Gateway 340.

Whenever a user joins the videoconferencing session, the Agent 350 may produce on the IM chat window informative messages as well as messages enabling session control through appropriately coded URLs. For example, it may output: "For meeting control such as recording the meeting, muting participants, etc., please click the following link: http://server.com/hash". Clicking the link may pop up a window with a web page that features the relevant controls, such as buttons, that may initiate the corresponding operations.

When the 'Video' user is invited into a meeting through a calendar invitation, then the invitation string may be added by Agent 350 to the calendar invitation.

The initiating user may also issue commands to the Agent 350 by typing text into the IM chat window. For example, it may write: "mute john" to request to the Agent 350 that user 'john' is muted. Since the IM system identifies the originator of text messages, the Agent 350 can know if the user is authorized to issue such commands or not.

The methods for initiating videoconferences in instant messaging systems, described above, can be implemented as computer software using computer-readable instructions and physically stored in computer-readable medium. The computer software can be encoded using any suitable computer languages The software instructions can be executed on various types of computers. For example, FIG. 6 illustrates a computer system 600 suitable for implementing embodiments of the present disclosure.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 600 can have many physical forms including an integrated circuit, a printed circuit board, a small handheld device (such as a mobile telephone or PDA), a personal computer or a super computer.

Computer system 600 includes a display 632, one or more input devices 633 (e.g., keypad, keyboard, mouse, stylus, etc.), one or more output devices 634 (e.g., speaker), one or more storage devices 635, various types of storage medium 636.

The system bus 640 link a wide variety of subsystems. As understood by those skilled in the art, a "bus" refers to a plurality of digital signal lines serving a common function. The system bus 640 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally contain a cache memory unit 602 for temporary local storage of instructions, data, or computer addresses. Processor(s) 601 are coupled to storage devices including memory 603. Memory 603 includes random access memory (RAM) 604 and read-only memory (ROM) 605. As is well known in the art, ROM 605 acts to transfer data and instructions uni-directionally to the processor(s) 601, and RAM 604 is used typically to transfer data and instructions in a bi-directional manner. Both of these types of memories can include any suitable of the computer-readable media described below.

A fixed storage 608 is also coupled bi-directionally to the processor(s) 601, optionally via a storage control unit 607. It provides additional data storage capacity and can also include any of the computer-readable media described below. Storage 608 can be used to store operating system 609, EXECs 610, application programs 612, data 611 and the like and is typically a secondary storage medium (such as a hard disk) that is slower than primary storage. It should be appreciated that the information retained within storage 608, can, in appropriate cases, be incorporated in standard fashion as virtual memory in memory 603.

Processor(s) 601 is also coupled to a variety of interfaces such as graphics control 621, video interface 622, input interface 623, output interface 624, storage interface 625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it is contemplated that the CPU 601 might receive information from the network 630, or might output information to the network in the course of performing the above-described method. Furthermore, method embodiments of the present disclosure can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor(s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A system for instant messaging and at least one of audio and video communication over a network, the system comprising:
   one or more instant messaging servers;
   at least one of an audio and a video communication server;
   one or more instant messaging clients coupled to the one or more instant messaging servers over the network;
   at least one of an audio and a video communication client coupled to the at least one communication server over the network; and a computer-based agent coupled to the one or more instant messaging servers and the at least one communication server;

wherein the agent is configured to respond to instant messaging invitations by placing a meeting URL in an instant messaging chat where it is invited.

2. The system of claim 1, further comprising:

a gateway coupled to the one or more instant messaging servers and the at least one communication server, wherein the meeting URL is configured so that if the at least one communication client is not available where the URL is accessed, it directs the instant messaging client where the URL is accessed to connect to the at least one communication server using the gateway.

3. The system of claim 1, wherein the agent is further configured to place one or more additional URLs to the instant messaging chat where it is invited, wherein the one or more additional URLs are configured to provide control for the audio or video communication session.

4. The system of claim 1, wherein the agent is further configured to parse text placed in the chat by the one or more instant messaging clients and respond to commands associated with it.

5. A method for instant messaging and communication over a network coupling one or more instant messaging clients to one or more instant messaging servers and at least one communication server, the method comprising:

providing a computer-based agent to the one or more instant messaging servers and the at least one communication server;

receiving, at the agent, an instant message invitation;

placing, with the agent, a meeting URL in an instant message chat where it is invited to initiate at least one of audio and video communication using the at least one communication server.

6. The method of claim 5, further comprising:

if the at least one communication client is not available where the URL is accessed, directing, by the meeting URL, the instant messaging client where the URL is accessed to connect to the at least one communication server using a gateway.

7. The method of claim 5, further comprising:

placing, by the agent, one or more additional URLs to the instant messaging chat where it is invited, wherein the one or more additional URLs are configured to provide control for the audio or video communication session.

8. The method of claim 5, further comprising parsing, by the agent, text placed in the chat by the one or more instant messaging clients; and responding to commands associated with the agent.

9. A non-transitory computer readable medium comprising a set of executable instructions to direct a processor to perform the method in claim 5.

10. A non-transitory computer readable medium comprising a set of executable instructions to direct a processor to perform the method in claim 6.

11. A non-transitory computer readable medium comprising a set of executable instructions to direct a processor to perform the method in claim 7.

12. A non-transitory computer readable medium comprising a set of executable instructions to direct a processor to perform the method in claim 8.

13. The system of claim 1, wherein the meeting URL enables a guest user to access the at least one of the audio and the video communication client regardless of whether the guest user has log in privileges.

14. The method of claim 5, wherein the meeting URL enables a guest user to access the at least one of audio and video communication using the at least one communication server regardless of whether the guest user has log in privileges.

15. A non-transitory computer readable medium comprising a set of executable instructions to direct a processor to perform the method in claim 14.

* * * * *